United States Patent [19]

Robertson

[11] 4,265,132
[45] May 5, 1981

[54] LINEAR-ROTARY TRANSLATOR

[76] Inventor: James R. Robertson, 1445 O'Hara Dr., Benicia, Calif. 94510

[21] Appl. No.: 34,202

[22] Filed: Apr. 27, 1979

[51] Int. Cl.³ .......................... F01B 9/00; F16H 21/44
[52] U.S. Cl. ........................................ 74/104; 74/526
[58] Field of Search ................... 74/102, 104, 526; 92/130 B, 130 C, 138, 140; 251/58, 231, 233, 234, 242, 243

[56] References Cited

U.S. PATENT DOCUMENTS

| | | | |
|---|---|---|---|
| 1,260,260 | 3/1918 | Harmon | 74/526 |
| 1,923,681 | 8/1933 | McCabe | 251/231 |
| 2,520,209 | 8/1950 | Hill | 74/526 |
| 3,104,592 | 9/1963 | Sheesley | 251/58 |
| 3,672,262 | 6/1972 | Karr | 74/104 |
| 3,704,986 | 12/1972 | Sheesley et al. | 74/104 |
| 3,727,523 | 4/1973 | Gulick | 92/130 C |
| 3,824,901 | 7/1974 | Shafer | 92/138 |

FOREIGN PATENT DOCUMENTS

| | | | |
|---|---|---|---|
| 628800 | 10/1961 | Canada | 251/58 |
| 5447 | of 1880 | United Kingdom | 251/58 |
| 946364 | 1/1964 | United Kingdom | 74/526 |
| 966039 | 8/1964 | United Kingdom | 74/104 |
| 971879 | 10/1964 | United Kingdom | 251/242 |

*Primary Examiner*—Lawrence J. Staab, Jr.
*Attorney, Agent, or Firm*—Lothrop & West

[57] ABSTRACT

A linear-rotary translator includes a pair of parallel, planar plates spaced apart and held by bolts having eccentric bodies. A drive shaft parallel to the bolts is journalled in the plates and is adapted to engage an operated device related to the plates. A pair of drive forks on the drive shaft straddle a drive rod between the plates and engage rollers extending from a block on the drive piston rod and disposed between the drive forks and reciprocable in rectilinear slots in the plates. The drive rod extends from a piston-cylinder arrangement pivoted to and located in part between the plates. If desired, a spring rod also engages the block, extends through a spacer pivoted between the plates and cooperates with spring discs arranged on the spring rod.

4 Claims, 5 Drawing Figures

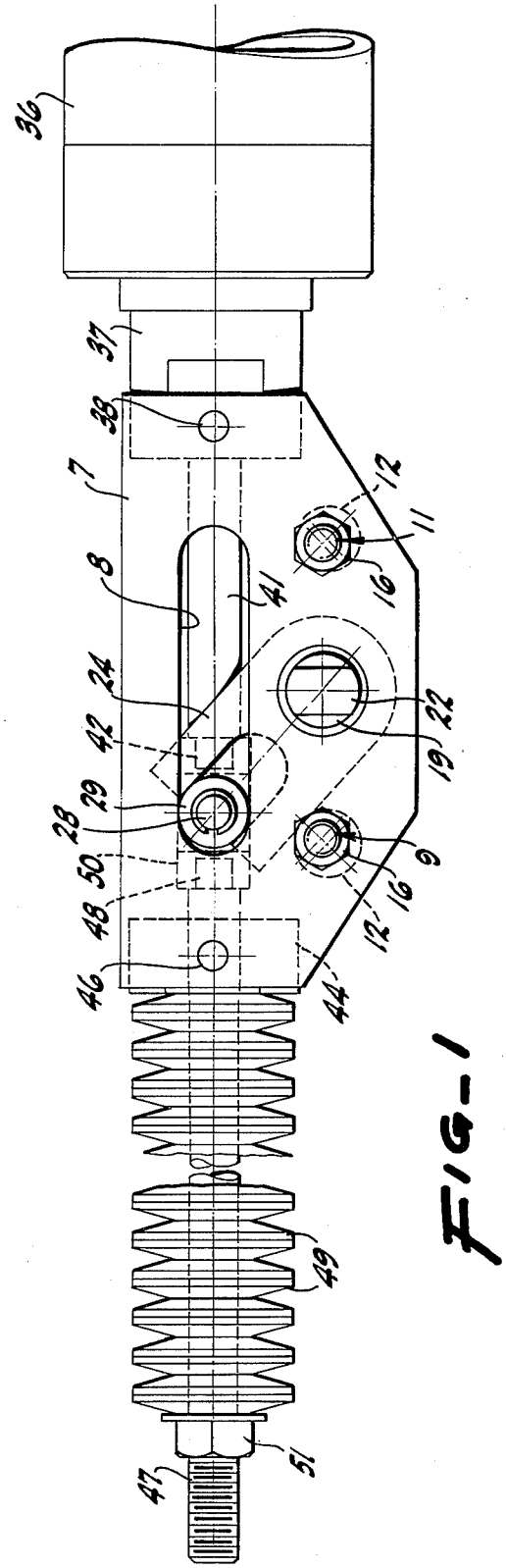
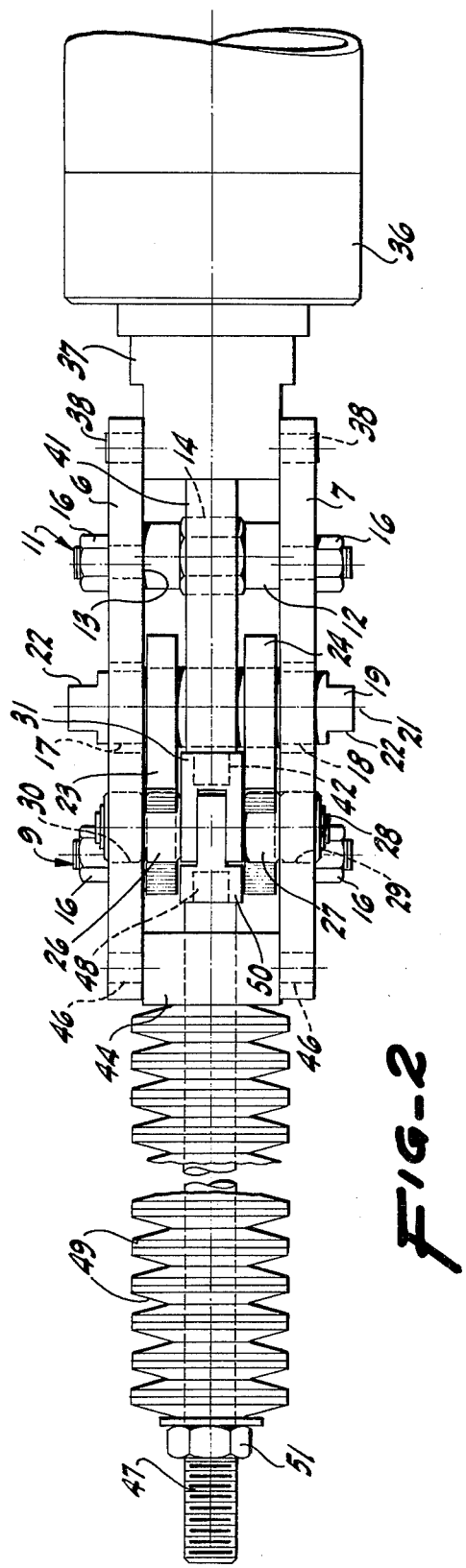

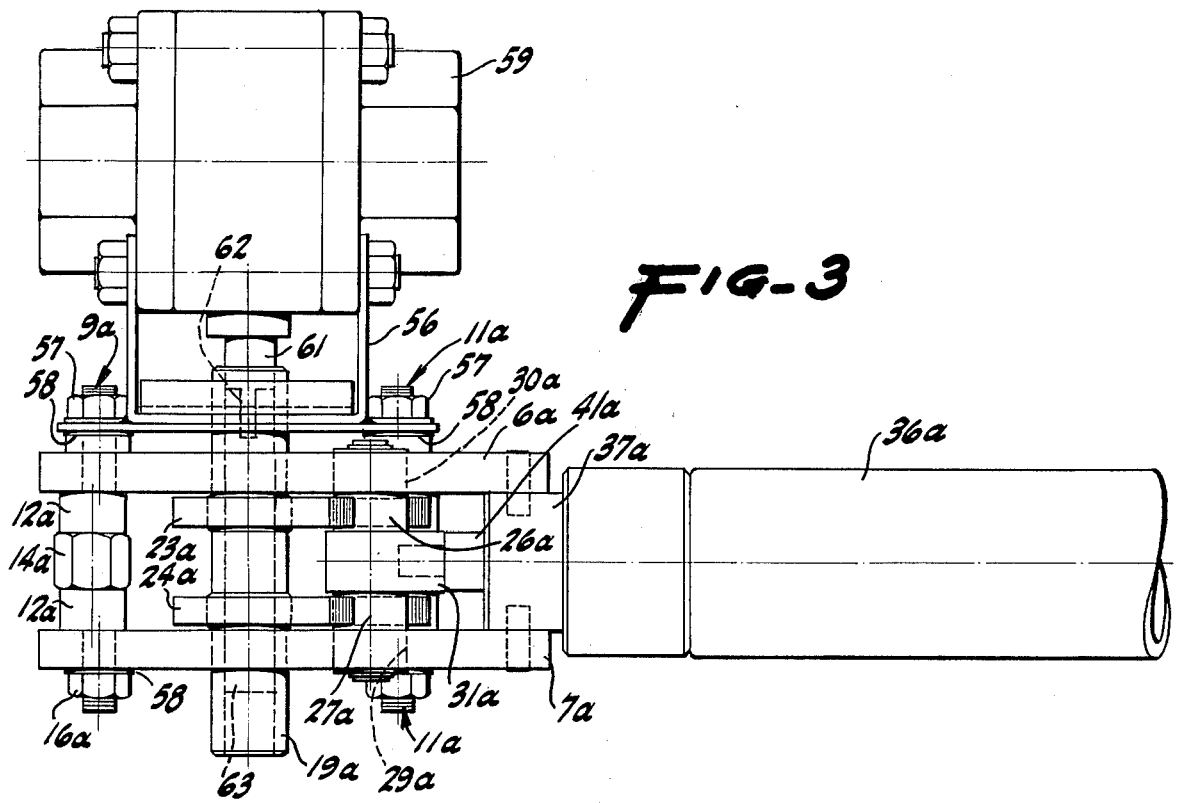
FIG-3
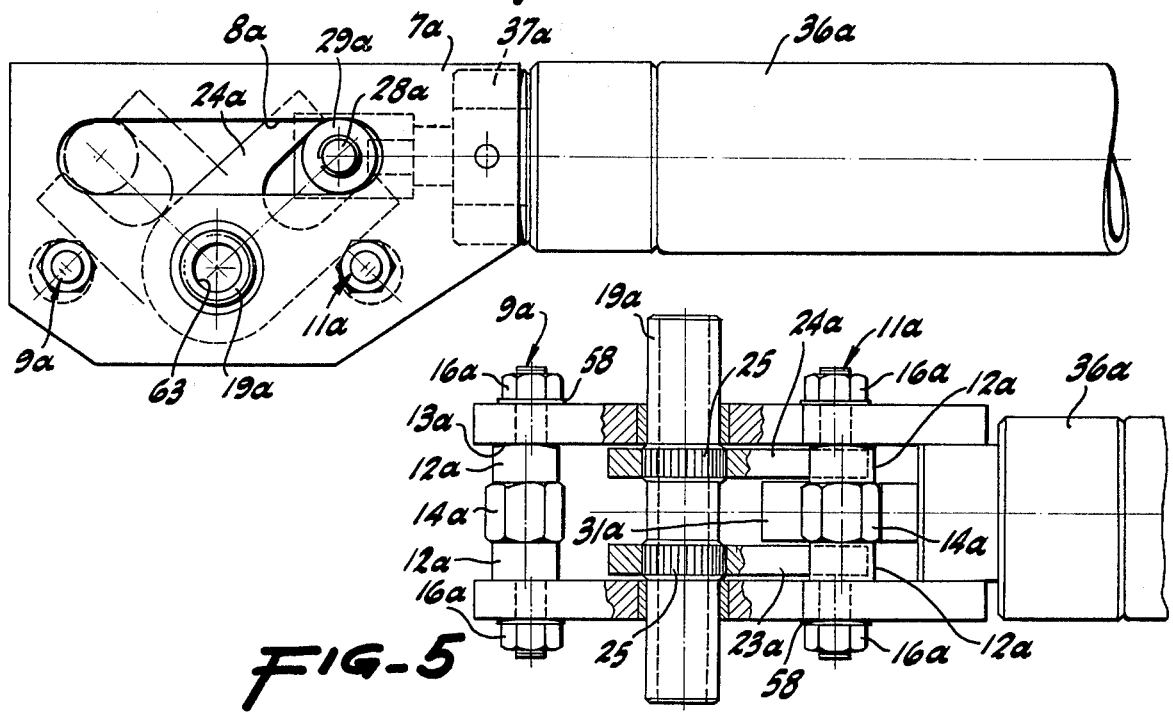
FIG-4
FIG-5

LINEAR-ROTARY TRANSLATOR

BRIEF SUMMARY OF THE INVENTION

For use in operating a device having a rotary shaft, there is provided a structure having a pair of superposed, spaced, parallel frame plates held together by screw bolts arranged normal to the plates and parallel to each other. The bolts have eccentric bodies, so that the free distance between the bolts can be varied. Also mounted on the plates in appropriate journals is a drive shaft having its rotary axis parallel to the bolt axes. Fixed on the drive shaft is a pair of forks disposed between the plates and engaging rollers rotatably mounted on a block disposed on a drive piston rod. This drive piston rod is part of a piston-cylinder combination itself pivoted between the plates. The rollers are constrained to rectilinear motion by rectilinear grooves in the plates. The cylinder is restrained solely by means axially parallel to the roller rotational axes and is always in non-binding relationship. If desired, the device may also include a spacer pivoted to the plates between them. A spring rod extends through the spacer and engages the block attached to the piston rod. A spring acts as a return mechanism when necessary. Preferably a plurality of spring discs surrounds and is positioned on the spring rod. The result of the assembly is to convert a rectilinear motion into a rotary motion of a driven shaft of an angular extent adjustably limited by the rotatable screw bolts and to provide a generally symmetrical, well-balanced arrangement.

BRIEF DESCRIPTION OF THE SEVERAL VIEWS OF THE DRAWINGS

FIG. 1 is a plan of a structure pursuant to the invention, portions being broken away to reduce the size of the figure, and showing the parts in one extreme position.

FIG. 2 is a side elevation of the structure shown in FIG. 1, certain portions being broken away to reduce the figure size.

FIG. 3 is a view comparable to FIG. 2 and showing an operated device in position on the translator and showing an arrangement in which the piston-cylinder arrangement is double-acting and without spring structure.

FIG. 4 is a plan of the structure shown in FIG. 3 with the operated device removed.

FIG. 5 is a detail of the device in side elevation, certain portions being broken away to reveal the interior construction.

DETAILED DESCRIPTION

There are many instances in which it is desired to mount and drive a rotary structure by means of a rectilinear actuator; for example, to rotate a valve having a rotary core by means of a linearly acting, expansible chamber such as a single-acting or double-acting piston-cylinder arrangement. The interconnection of devices of this sort is often accomplished, but many times the arrangement is such that after a while a number of unbalanced forces produce distortions in the connecting mechanism or produce excessive wear. Under other circumstances, if a more elaborate structure is provided, the cost of manufacture and sale thereof is too high for commercialization.

It is therefore an object of this invention to provide a generally improved, linear-rotary translator in which the various inherent forces are well balanced and well taken and in which various settings and provisions are made for relatively inexpensive, long-term, successful operation.

In the form of the device shown, in part, in FIGS. 1 and 2, there is provided a pair of frame plates 6 and 7. These may be of any suitable material, metallic or non-metallic, and are shaped or trimmed to about the contour shown in plan in FIG. 1. Each plate is similarly provided with a rectilinear slot 8 therein.

The plates are assembled in registry and in spaced-apart relationship by a pair of special through bolts 9 and 11 passing through suitable openings in the plates. Each of the bolts is provided with a central body 12 disposed eccentrically or with its axis eccentric to the bolt axis. The body 12 has shoulders 13 thereon adapted to abut the facing sides of the plates. The central body 12 also has a hexagonal or wrench-engaging portion 14.

When the bolts are assembled with the plates, the plates are held in parallelism and in registry by the bolt bodies and bolt shanks and are clamped by nuts 16 engaging threads on the bolts. However, the nuts can be loosened for rotation of the bolt bodies by engagement of a wrench with the hexagonal portions 14, and can be tightened so that the bolts cannot be rotated. In this fashion there is provided a fundamental framework for the structure which, however, is subject to ready disassembly and to ready adjustment to change the free space between the central bodies of the bolts.

Pursuant to the invention, the plates 6 and 7 are also provided with aligned journal apertures 17 and 18. A drive shaft 19 has bearing portions rotatable within the openings 17 and 18 in both of the plates 6 and 7 about an axis 21 parallel to the axes of the bolts 9 and 11 and the pins 38 and 46. Conveniently, the drive shaft 19 has characterized ends 22 thereon for engagement with other devices.

Mounted on the drive shaft 19 is a pair of drive forks 23 and 24. These are substantially identical and are appropriately fixed on the drive shaft, as shown in FIG. 5, by serrations 25 in appropriate locations on the drive shaft interlocking with serrations within the forks. The parts are axially forced together for proper axial spacing and for rotation in unison. When the shaft 19 is rotated, the forks are swung in an arc, being effective between rotary end stops provided by the adjusted positions of the bolt bodies 12. In this way, the extent of swinging and the stopping points for the forks can readily be set.

Each of the forks is in engagement with one of a pair of rollers 26 and 27 removably held by clips in vertical alignment on a drive pin 28 having its axis parallel to the axis 21 and anchored in a preferably rectangular, forked block 31 bored to receive the pin 28. The rollers 26 and 27 ride in the respective slots of the respective forks 23 and 24 as the forks swing from side to side about the axis 21, while comparable rollers 29 and 30 on the pin 28 engage the respective linear slots 8. The rollers, being separate, can revolve at different speeds according to their abutting members, thus reducing wear. The block 31 moves, but only in a rectilinear path, being guided laterally by the constrained rollers and being guided vertically by abutment of the block 31 against the facing surfaces of the forks 23 and 24. This mechanism is effective to translate rotary motion of the shaft 19 into rectilinear motion of the block 31, and vice versa.

In order to afford a power mechanism, there is provided any suitable sort of driver. Preferably, this is a standard cylinder mechanism 36 having an end body 37 contoured to fit between the plates 6 and 7. The body 36 is anchored to the plates by pivot pins 38 set in the body 37 and in the adjacent plates. By this construction, the cylinder 36 has some free orientation. Despite some possible distortions in service, misalignment, or variations in manufacture of the parts, the cylinder mechanism 36 does not bind with regard to the plates 6 and 7. This non-binding effect occurs in the direction of the axis of the pins 38 also, since some play in that direction is arranged.

The cylinder 36 can be single-acting, as indicated in FIGS. 1 and 2, and carries a standard interior piston (not shown) connected to a drive rod 41 having a threaded end 42 screwed into one end of the block 31, so that upon reciprocation of the drive rod 41 the block is similarly moved to rotate the shaft 19, and vice versa.

Often, when the cylinder-piston mechanism is single-acting, there is also disposed between the plates 6 and 7 a spacer 44 having pivot pins 46 to join the spacer, like the body 37, between and to the plates 6 and 7. The spacer 44 has a central bore through which slides a spring rod 47 at one end carrying threads 48 interengaging with a rectangular block 50 having a tongue disposed between the forks 23 and 24 and, like the forked block 31, also bored to receive the pin 28. The spring rod 47 is disposed in axial alignment with the drive rod 41. The spring rod carrier a number of disc spring washers 49 threaded thereon and set at desired abutment pressure by a nut 51 screwed onto the rod 47. With this washer or disc spring arrangement, movement of the rod 47 produces corresponding deflections in the washers 49 and a corresponding spring load on the block 31. With this arrangement, actuation of the drive rod 41 by the cylinder 36 controls rectilinear motion thereof in both directions and a corresponding rotation of the shaft 19 to drive any implement connected to such shaft.

Preferably, the various moving parts have appropriate clearances, so that there will be no binding and so that the parts can remain in good operating alignment. Sometimes also, the various fastenings, particularly the nuts 16 and the bolts 9 and 11, are positioned with respect to the plates 6 and 7 by intervening washers, not only lock washers, but often preferably of an electrically non-conducting or fibrous nature. Not only is there some yielding possible to make sure there is no misalignment or binding, but also to isolate any possible electrolytic action. These items are not shown in the drawings for simplicity of illustration.

In many instances, instead of utilizing a single-acting cylinder arrangement with a return spring, there is utilized a double-acting cylinder arrangement; for example, with a valve as shown in FIG. 3. In this embodiment, the parts are substantially the same as heretofore described except that the block 31a is not forked and does not join any spring rod. Also, the bolts 9a and 11a are somewhat longer, although not otherwise changed, in order to receive a frame assembly 56 made up of a number of sheet metal plates appropriately secured together to afford a mounting and stiffening frame. This is in part pierced to overlie the bolts and to be anchored by securing nuts 57 against intervening fiber washers 58 or like mountings. On the frame 56 is disposed a valve 59, or the like, actuated by a rotary, central shaft 61 having a blade and interfitting with a cross slot in an added core 63 within the hollow shaft 19a. Conveniently, the core 63 is glued or cemented in position against axial or rotary movement relative to the shaft 19a and also has another cross slot in the other end at ninety degrees to the first cross slot. With this arrangement, the valve 59 can be installed in inverted position and with different shaft angularity.

With this arrangement, actuation of the drive rod 41a in either axial direction causes a rotation of the forks of the shaft 19a, of the core 63 and consequently of the rotary member 61 for actuating the valve 59, or the like.

In this arrangement also, by loosening various of the fastenings and engaging a wrench with the hexagonal portion of the through bolts, it is possible to swing the eccentric bolt bodies so that the end points or motion limits of the actuator can be suitably adjusted. All of the forces involved in working operation are imposed on the parts without binding and without undue warping or bending, so that despite numerous operations and under relatively heavy loads the life of the structure is substantial.

I claim:

1. A linear-rotary translator comprising a pair of parallel frame plates each having one of a pair of rectilinear slots therethrough, a pair of parallel bolts extending through said plates, bodies on said bolts having shoulders between and adapted to abut said plates, a drive shaft mounted for rotation in both of said plates about an axis parallel to said bolts, a pair of drive forks secured to said drive shaft and movable into abutment with said bodies, a drive pin movable in said slots and in said forks, a cylinder having an end body disposed between said frame plates, pivot pins parallel to said drive pin and engaging said end body and said frame plates for securing said cylinder to said frame plates against relative axial translation but for small relative rotation about said pivot pins, a drive rod reciprocable in said cylinder and extending between said frame plates, a block on said drive rod, and rollers on said block disposed in said pair of drive forks and in said rectilinear slots.

2. A device as in claim 1 including a spacer disposed between said frame plates, pivot pins parallel to said drive pin and engaging said spacer and said frame plates, a spring rod slidable in said spacer, a block on said spring rod engaging said drive pin, and a spring secured to said spring rod and abutting said spacer.

3. A linear-rotary translator comprising a pair of parallel frame plates each having one of a pair of rectilinear slots therethrough, means for holding said frame plates parallel to each other and with said rectilinear slots in registry, a drive shaft mounted for rotation in both of said frame plates about an axis normal to said frame plates, a pair of drive forks secured to said drive shaft and having drive slots in substantial registry, a drive pin movable in said slots and in said forks, a cylinder having an end body disposed between said frame plates, pivot pins disposed parallel to said axis and engaging said end body and said frame plates for minor relative rotation thereof, a drive rod reciprocable in said cylinder and extending between said frame plates, a block fixed on said drive rod, and rollers pivotally mounted on said block for engagement with said drive slots in said forks and with said rectilinear slots in said frame plates.

4. A linear-rotary translator as in claim 3 and including a spacer between said frame plates and encompassing said rod, means including pivot pins interconnecting said spacer and said frame plates for minor relative rotation, a spring surrounding said rod and abutting said spacer, and means for interconnecting said spring and said rod.

* * * * *